US012026177B2

(12) United States Patent
Grimaldi et al.

(10) Patent No.: US 12,026,177 B2
(45) Date of Patent: Jul. 2, 2024

(54) DYNAMIC ADAPTIVE PARTITION SPLITTING

(71) Applicant: HITACHI VANTARA LLC, Santa Clara, CA (US)

(72) Inventors: Kevin Canuette Grimaldi, Austin, TX (US); Joshua Jen Monzon, Brighton, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 79 days.

(21) Appl. No.: 17/774,498

(22) PCT Filed: Dec. 27, 2019

(86) PCT No.: PCT/US2019/068666
§ 371 (c)(1),
(2) Date: May 5, 2022

(87) PCT Pub. No.: WO2021/133405
PCT Pub. Date: Jul. 1, 2021

(65) Prior Publication Data
US 2022/0391411 A1    Dec. 8, 2022

(51) Int. Cl.
*G06F 16/27* (2019.01)
*G06F 11/34* (2006.01)
(Continued)

(52) U.S. Cl.
CPC ........ *G06F 16/278* (2019.01); *G06F 11/3409* (2013.01); *G06F 16/2343* (2019.01); *G06F 16/24573* (2019.01); *G06F 2201/81* (2013.01)

(58) Field of Classification Search
CPC ............ G06F 16/278; G06F 16/24573; G06F 16/2343; G06F 11/3409
See application file for complete search history.

(56) References Cited

U.S. PATENT DOCUMENTS 9,489,443 B1    11/2016   Muniswamy-Reddy et al.
10,025,673 B1 *  7/2018   Maccanti ............ G06F 11/1451
(Continued)

FOREIGN PATENT DOCUMENTS

JP    2001-142752 A    5/2001

OTHER PUBLICATIONS

International Search Report of PCT/US2019/068666 dated Mar. 10, 2020.
(Continued)

*Primary Examiner* — Huawen A Peng
(74) *Attorney, Agent, or Firm* — MATTINGLY & MALUR, PC

(57) ABSTRACT

In some examples, a computing device may store a first snapshot of a state of data in a first partition at a first point in time. The computing device may create a second partition and a third partition to each receive a portion of the data, the second partition and the third partition each including a metrics schema, and may determine information for the metrics schemas based on information in the first snapshot. During the determining of the information for the metrics schemas, the computing device may receive a write to the first partition. The computing device may update the first partition based on the write and may add a split update command to a data structure based on the write. In addition, the computing device may update at least one of the metrics schemas in the second partition or the third partition based on the split update command.

11 Claims, 10 Drawing Sheets

(51) Int. Cl.
  *G06F 16/23*      (2019.01)
  *G06F 16/2457*    (2019.01)

(56) References Cited

U.S. PATENT DOCUMENTS

| | | | |
|---|---|---|---|
| 10,346,434 B1* | 7/2019 | Morkel | G06F 16/27 |
| 2009/0157776 A1 | 6/2009 | McGarvey | |
| 2012/0124310 A1* | 5/2012 | Bartfai | H04L 67/1095 |
| | | | 711/E12.103 |
| 2012/0254175 A1* | 10/2012 | Horowitz | G06F 16/278 |
| | | | 707/E17.046 |
| 2013/0290249 A1* | 10/2013 | Merriman | G06F 16/278 |
| | | | 707/610 |
| 2015/0095347 A1 | 4/2015 | Kimmel et al. | |
| 2015/0120658 A1 | 4/2015 | Rath et al. | |
| 2018/0096045 A1 | 4/2018 | Merriman et al. | |
| 2018/0357264 A1 | 12/2018 | Rice et al. | |
| 2022/0083529 A1* | 3/2022 | Jain | G06F 16/2358 |

OTHER PUBLICATIONS

Japanese Office Action received in corresponding Japanese Application No. 2022-539389 dated Sep. 5, 2023.
Extended European Search Report received in corresponding European Application No. 19957752.9 dated Aug. 4, 2023.

* cited by examiner

DYNAMIC ADAPTIVE PARTITION SPLITTING

TECHNICAL FIELD

This disclosure relates to the technical fields of databases, data storage and storage management.

BACKGROUND

Multi-partitioned distributed databases may provide horizontal scalability by dividing data amongst multiple computing devices, also referred to as "computing nodes". As an example, as a partition gets larger, the partition may be split or otherwise divided into two partitions, such as for improving access to the data in the partition and/or controlling the size of the partition. Thus, splitting a partition can enable elastic scaling of the storage. However, when a partition split is performed, access to the partition that is subject to the split may be restricted while the system performs processing to maintain data consistency between the original partition and the new partition(s). The restricted access during this time may be inconvenient for users working with data in the partition.

SUMMARY

Some implementations include a computing device that stores a first snapshot of a state of data in a first partition at a first point in time. The computing device may create a second partition and a third partition to each receive a portion of the data, the second partition and the third partition each including a metrics schema. Further, the computing device may determine information for the metrics schemas based on information in the first snapshot. During the determining of the information for the metrics schemas, the computing device may receive a write to the first partition. The computing device may update the first partition based on the write and may add a split update command to a data structure based on the write. In addition, the computing device may update at least one of the metrics schemas in the second partition or the third partition based on the split update command.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
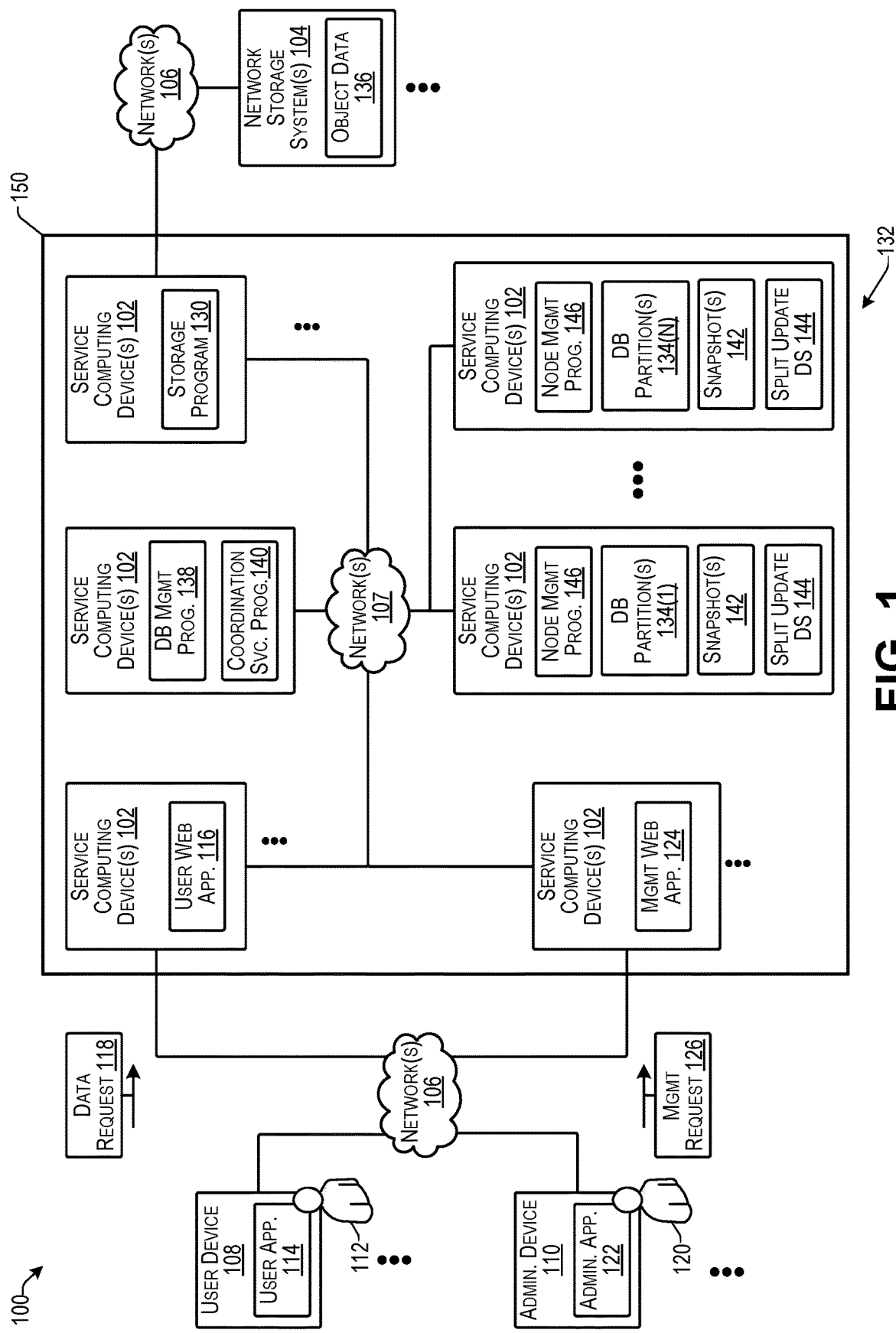
FIG. 1 illustrates an example architecture of a system including partitioned data according to some implementations.

Some implementations herein are directed to techniques and arrangements for decreasing or eliminating an amount of time during which writes to a partition are blocked during division of a partition into multiple partitions, also referred to as a partition split. For instance, the techniques herein may lead to substantially improved availability and less data access downtime as compared to conventional techniques. In some examples, an asynchronous pre-split optimization phase may be performed in the background without involving a lock of the partition, in which writes to the partition are prevented. Examples of write operations to a partition that might typically be prevented by the system during performance of a split operation on the partition may include data writes to existing objects, object creations, object deletions, changes to metadata, or the like.

In order to reduce the time window during which writes are blocked during a partition split, some examples herein may process the existing records in the partition as a background process using a snapshot of the partition, while still allowing writes to the partition, such as by clients or the like. As one example, record information for new writes received during the processing may be stored as split update commands in a data structure. After processing all the existing records currently in the partition, the system may then block writes and process any new records that have been stored to the split update data structure for writes received while the existing records in the partition were being processed. Additionally, in some cases, additional snapshot(s) may be taken for the partition including the new writes, and the additional snapshot(s) may be used to further reduce or eliminate the need to block writes. After all records in the split update data structure are processed, the system may start up the new partitions created during the split operation, shut down and mark for deletion the old partition, and allow write operations to be serviced by the new partitions. Accordingly, by blocking writes just during processing of a small subset of records in the split update data structure corresponding to writes received while the split processing is being performed on the snapshot, the examples herein significantly reduce the amount of time during which clients are unable to write to the partition.

In addition, when performing a partition split, implementations herein are able to process each record in the partition with an improved speed relative to conventional techniques. For instance, when processing records in a partition according to indicated schemas, the system may hash each key to locate each record. Rather than employing a cryptographically secure hashing algorithm, as in conventional techniques, implementations herein improve the processing speed by using a low-collision non-cryptographically secure hashing algorithm. One example of a suitable hashing algorithm is the FarmHash Fingerprint64 open source algorithm that may be employed to hash the keys herein, which substantially improves the processing time of each record. Thus, by decreasing the number of records processed and by speeding up the time to process each record, implementations herein are able to significantly reduce the amount of time during which writes are blocked during a partition split.

In some implementations, each schema (e.g., the organization or structure for the database, data, or a portion thereof) may begin with one or more partitions in a cluster or other plurality of computing nodes. As a particular partition gets larger, the partition may reach a size threshold, or other metric threshold, that may trigger splitting of the partition. As one example, the partition may be dynamically divided into two child partitions, and those child partitions may be distributed to separate nodes within the plurality of computing nodes which can essentially double the throughput for that schema.

Some examples herein may include a Raft-algorithm-based partitioned-and-distributed database able to achieve horizontal scalability. For instance, suppose that the database begins with a single partition for a schema. As the partition grows larger, the partition may be split into two or more child partitions. Further, those child partitions may be distributed into separate computing nodes within the plurality of computing nodes, which improves the throughput for that schema. As more and more data is ingested, the partitions will keep getting larger and, according to implementations herein may continually split dynamically. This enables the data in the partitions to be distributed across all the computing devices in the cluster in discrete partitions, causing the load on the plurality of computing devices in the cluster to be evenly distributed. Furthermore, as more computing devices are added to the cluster, the number of partitions may continue to increase, and the partitions may be spread across the system elastically and indefinitely as additional computing nodes are added to the system. Additionally, through the use of the non-cryptographically secure hashing function, the records within the partitions may be spread evenly to provide optimal throughput for the distributed partitions.

The examples herein make the stored data highly available by storing strongly consistent copies of the data in a distributed-partition configuration across multiple service computing devices. In some cases, the consistency of the distributed data in the distributed partitions may be maintained using the Raft consensus algorithm. In the Raft consensus algorithm, one computing node may be elected as a leader and may be responsible for servicing all read and write operations. The other computing nodes are follower nodes which receive copies of all transactions to enable them to update their own partitions. Should the leader computing node fail, one of the follower computing nodes may be elected as leader and may take over serving read and write transactions. Client computing devices of the system herein are able to discover which computing node is the Raft leader and direct requests to that computing node. If the leader of a partition should change, the clients may be automatically routed to the new leader.

For discussion purposes, in some examples herein, the partitions may contain metadata of a metadata database that describes data stored in one or more external storage nodes, storage nodes within the system, cloud storage devices, or the like. However, implementations herein are not limited to this use, and may apply to other types of data, databases, storage configurations, and the like. Furthermore, some example implementations are described in the environment of one or more service computing devices in communication with a cloud storage or other network storage system for managing storage of data using a distributed metadata database. Furthermore, while partition splits are described in the examples herein, the techniques described herein may also be applied to partition merges. Accordingly, implementations herein are not limited to the particular examples provided, and may be extended to other types of computing system architectures, other types of storage environments, other types of client configurations, other types of data, and so forth, as will be apparent to those of skill in the art in light of the disclosure herein.

FIG. 1 illustrates an example architecture of a system 100 including partitioned data according to some implementations. The system 100 includes a plurality of service computing devices 102 (also referred to as "computing nodes" in some examples) that are able to communicate with, or otherwise coupled to, at least one network storage system(s) 104, such as through one or more networks 106. Further, the service computing devices 102 are able to communicate over the network(s) 106 with one or more user computing devices 108 and one or more administrator devices 110, which may be any of various types of computing devices, as discussed additionally below.

In some examples, the service computing devices 102 may include one or more servers that may be embodied in any number of ways. For instance, the programs, other functional components, and at least a portion of data storage of the service computing devices 102 may be implemented on at least one server, such as in a cluster of servers, a server farm, a data center, a cloud-hosted computing service, a distributed computing system, and so forth, although other computer architectures may additionally or alternatively be used. Additional details of the service computing devices 102 are discussed below with respect to FIG. 10.

The service computing devices 102 may be configured to provide storage and data management services to users 112. As several non-limiting examples, the users 112 may include users performing functions for businesses, enterprises, organizations, governmental entities, academic entities, or the like, and which may include storage of very large quantities of data in some examples. Nevertheless, implementations herein are not limited to any particular use or application for the system 100 and the other systems and arrangements described herein.

The network storage system(s) 104 may be referred to as "cloud storage" or "cloud-based storage" in some examples, and, in some cases, may enable a lower cost storage solution per gigabyte than local storage that may be available at the service computing devices 102. Furthermore, in some examples, the network storage system(s) 104 may include commercially available cloud storage as is known in the art, while in other examples, the network storage system(s) 104 may include private or enterprise storage systems accessible only by an entity associated with the service computing devices 102, or combinations thereof.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing devices 102, the network storage system(s) 104, the user devices 108, and the administrative devices 110 are able to communicate over the one or more networks 106 using wired or wireless connections, and combinations thereof.

In addition, the service computing devices 102 may be able to communicate with each other over one or more networks 107. In some cases, the one or more networks 107 may be a LAN, private network, or the like, while other cases, the one or more networks 107 may include any of the networks 106 discussed above.

Each user device 108 may be any suitable type of computing device such as a desktop, laptop, tablet computing device, mobile device, smart phone, wearable device, terminal, and/or any other type of computing device able to send data over a network. Users 112 may be associated with user devices 108 such as through a respective user account, user login credentials, or the like. Furthermore, the user devices 108 may be able to communicate with the service computing device(s) 102 through the one or more networks 106, through separate networks, or through any other suitable type of communication connection. Numerous other variations will be apparent to those of skill in the art having the benefit of the disclosure herein.

Further, each user device 108 may include a respective instance of a user application 114 that may execute on the user device 108, such as for communicating with a user web application 116 executable on the service computing device(s) 102, such as for sending user data for storage on the network storage system(s) 104 and/or for receiving stored data from the network storage system(s) 104 through a data request 118 or the like. In some cases, the application 114 may include a browser or may operate through a browser, while in other cases, the application 114 may include any other type of application having communication functionality enabling communication with the user web application 116 over the one or more networks 106.

In the system 100, the users 112 may store data to, and receive data from, the service computing device(s) 102 that their respective user devices 108 are in communication with. Accordingly, the service computing devices 102 may provide local storage for the users 112 and respective user devices 108. During steady state operation there may be users 108 periodically communicating with the service computing devices 102.

In addition, the administrator device 110 may be any suitable type of computing device such as a desktop, laptop, tablet computing device, mobile device, smart phone, wearable device, terminal, and/or any other type of computing device able to send data over a network. Administrators 120 may be associated with administrator devices 110, such as through a respective administrator account, administrator login credentials, or the like. Furthermore, the administrator device 110 may be able to communicate with the service computing device(s) 102 through the one or more networks 106, through separate networks, or through any other suitable type of communication connection.

Further, each administrator device 110 may include a respective instance of an administrator application 122 that may execute on the administrator device 110, such as for communicating programs executing on the service computing devices to manage the plurality of service computing devices. As one example, the administrator application may communicate with a management web application 124 executable on the service computing device(s) 102, such as for sending management instructions for managing the system 100, as well as for sending management data for storage on the network storage system(s) 104 and/or for receiving stored management data from the network storage system(s) 104, such as through a management request 126 or the like. In some cases, the administrator application 122 may include a browser or may operate through a browser, while in other cases, the administrator application 122 may include any other type of application having communication functionality enabling communication over the one or more networks 106 with the management web application 124 or other programs executing on the service computing devices 102.

The service computing devices 102 may execute a storage program 130, which may provide a gateway to the network storage systems(s) 104, such as for sending data to be stored to the network storage systems(s) 104 and for retrieving requested data from the network storage systems(s) 104. In addition, the storage program 142 may manage the data stored by the system 100, such as for managing data retention periods, data protection levels, data replication, and so forth.

The service computing devices 102 may further include a database (DB) 132, which may be divided into a plurality of DB partitions 134(1)-134(N) and which may be distributed across a plurality of the service computing devices 102. For example, the DB 132 may be used for managing object data 136 stored at the network storage system(s) 104. The DB 132 may store or may otherwise include numerous metadata about the object data 136, such as information about individual objects, how to access the individual objects, storage protection levels for the object data, storage retention periods, object owner information, object size, object type, and so forth. Further, a DB management program 138 may manage and maintain the DB 132 such as for adding new computing nodes to the DB 132, coordinating updating of the DB 132 as new objects are stored, old objects are deleted, objects are migrated, and the like.

In addition, a coordination service program 140 may send an instruction to a selected partition leader to instruct the partition leader to perform a partition split. For example, the coordination service program 140 may monitor the service computing devices 102 having partition leaders thereon and may further monitor the size of the database partitions 134 on each of the service computing devices 102. In some examples, the coordination service program 140 may determine to send an instruction to split a partition to the partition leader, such as based on the partition reaching a partition size threshold, a traffic volume threshold, a response latency threshold, or the like.

As mentioned above, the DB partitions 134 may include a plurality of partitions that include duplicate partitions distributed across multiple ones of the service computing devices 102. In some examples, a plurality of the service computing devices 102 that include the DB partitions 134 may be configured in a Raft consensus algorithm configuration for management of partitioned data, such as for providing redundancy of the DB 132 at multiple service computing devices 102. The partitioned DB 132 herein may provide high-availability by enabling writes and deletes to be carried out with minimal downtime during splitting of a partition. Further, the DB 132 herein provides scalability by partitioning the metadata and distributing the metadata across distinct service computing devices that serve as DB computing nodes. Each partition 134 may have a single service computing device that serves as the partition leader. The partition leader may be responsible for serving all requests for that specific partition 134. Further, the solution herein optimizes the ability for a client application, such as the user application 114, to write data to the partition 134 while, as compared with conventional techniques, substantially reducing a time during a partition split during which writing of data is blocked.

In some examples, as discussed additionally below, when performing a split, the service computing device 102 that maintains the leader partition may take a snapshot 142 of the partition 134 before beginning processing to split the partition. The partition leader may further maintain a split update data structure (DS) 144 for the partition being split, and may process writes to the partition that are received after taking the snapshot by storing corresponding records in the split update DS 144. In some examples, the split update DS 144 may be any suitable type of data structure, such as a separate schema, table, or the like. In some cases, the split update DS 144 may be a durable data structure such that the split update DS 144 is able to survive a system crash or the like. As one example, the split update DS 144 may be replicated according to the Raft algorithm, such as to provide two additional copies of the split updates DS 144 stored on others of the service computing devices 102. Implementations herein are not limited to any particular configuration for the split update DS 144.

Furthermore, the service computing devices 102 may include a node management program 146 that is executed by the service computing devices 102 to perform the splitting of partitions and other functions attributed to the service computing devices 102 herein. As the processing for dividing the partition is being performed on the snapshot 142 in the background, any writes received to the partition may be stored to the partition, and the split updates DS 144 may be updated with a split update command corresponding to the received write. When the processing for splitting the partition has been completed, the partition leader may apply the commands stored in the split update DS 144 to the new partitions, which may indicate metrics changes over the snapshot 142, such as a total number of objects or a total size of the objects. Additionally, in some cases, rather than blocking writes at this stage while updating of the new partitions is completed, a second snapshot 142 may be take of the original partition including the newly received writes stored to the partition. In some examples, this recursive process may be repeated a limited number of times, such as three or four times so that it does not result in an un-ending loop. Further, in some cases, if the split update DS 144 does not have any updates in it, then there is not a need to block writes to the partition at that point, and the new partitions resulting from the split of the original partition may be put into service and may begin receiving any new writes. Additional details of the partition splitting techniques herein are discussed below.

In some cases, the service computing devices 102 may be arranged into one or more groups, clusters, systems, or the like, at a site 150. In some cases a plurality of sites 150 may be geographically dispersed from each other such as for providing data replication, disaster recovery protection, or the like. Further, in some cases, the service computing devices 102 at a plurality of different sites 150 may be configured for securely communicating with each other, such as for providing a federation of a plurality of sites 150.

Figure 2:
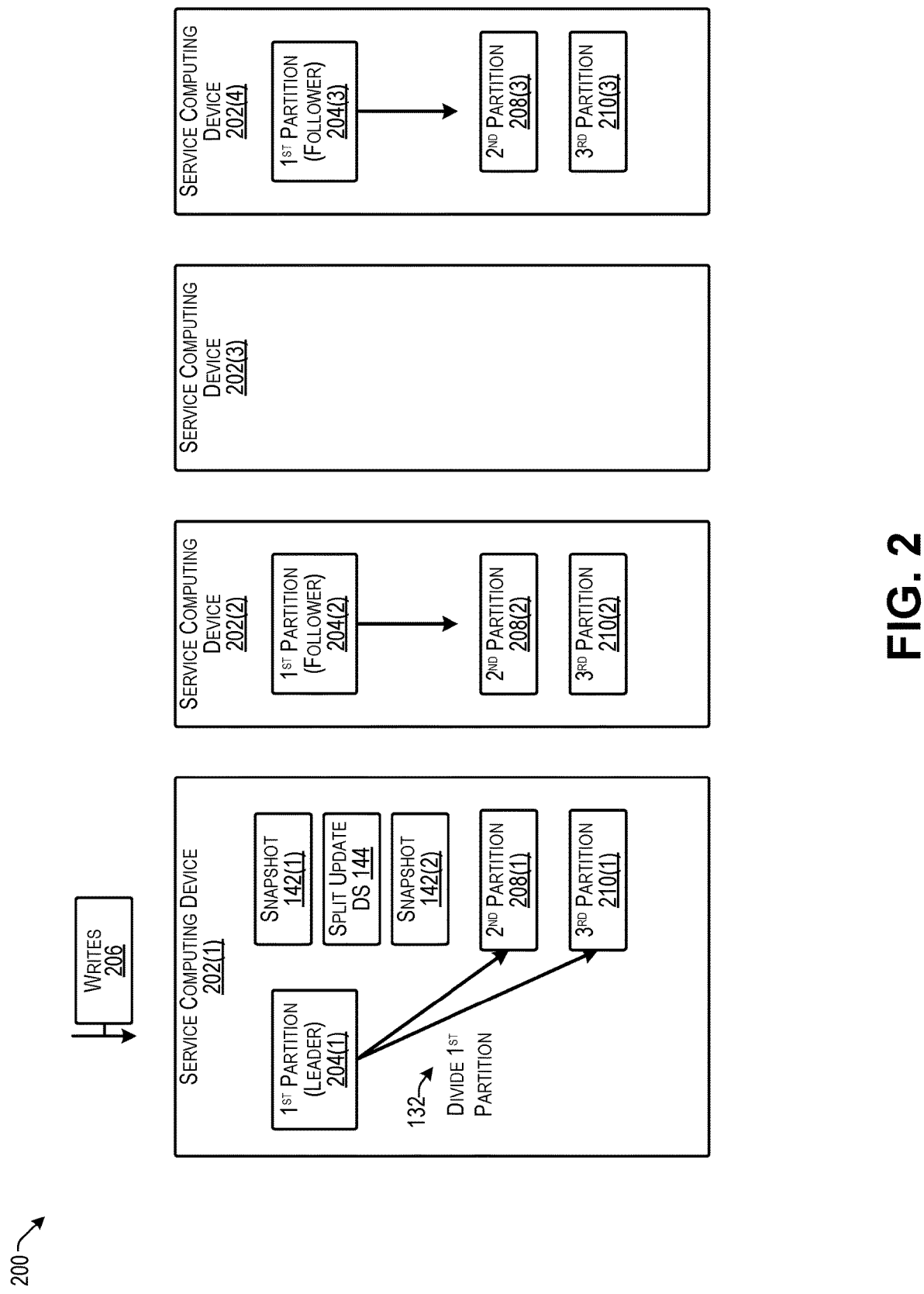
FIG. 2 is a block diagram illustrating an example logical configuration of a system during performance of a partition split according to some implementations.

FIG. 2 is a block diagram illustrating an example logical configuration of a system 200 during performance of a partition split according to some implementations. In some examples, the system 200 may correspond to the system 100, and the service computing devices 202 may correspond to the service computing devices 102 discussed above or any of various other possible computing system architectures, as will be apparent to those of skill in the art having the benefit of the disclosure herein. In the system 200, scalability may be provided by logically partitioning the stored data, and by dynamically dividing partitions based on one or more thresholds being reached to provide two or more partitions to serve the function of the original partition.

In the illustrated example, a plurality of service computing devices 202(1)-202(4) are included in the system 200. For example, suppose a first partition has been created in the system 200, and the first partition includes a leader partition 204(1) and two follower partitions 204(2) and 204(3), such as based on the Raft consensus algorithm. As mentioned above, determinations about partition splitting and distribution of partitions across the plurality of service computing devices 202 may be managed by the coordination service program 140 (not shown in FIG. 2), which ensures that partitions are balanced evenly throughout the plurality of computing devices. In some examples, the coordination service program 140 may be hosted in its own stateless container. Further, in some cases, partitions may be instructed to split when they reach a certain size threshold, or satisfy some other metric threshold. The size threshold may be dynamic in some cases, and/or may be adjusted dynamically to increase or throttle partition splitting frequency. Other criteria for determining which partitions to split, might be dependent on geography, disk or memory utilization of the service computing device on which a partition resides, network latency of the service computing device on which the partition resides, a traffic volume threshold, a response latency threshold, and so forth.

In the illustrated example, suppose that the service computing device 202(1) maintaining the first partition leader 204(1) has received an instruction from the coordination service program to split the first partition 204. Thus, in some cases, splitting of a partition may be handled by the service computing device 202(1) that maintains the partition leader 204(1). When the service computing device 202(1) maintaining the first partition 204(1) receives a split request to split the first partition 204, the service computing device 202(1) may mark the first partition as currently being split, such as by any suitable technique, e.g., using an indicator as discussed below with respect to FIGS. 5-8. As mentioned above, the splitting may be performed by execution of the node management program 146 on the service computing device 202(1).

In some examples, all three of the first partitions may perform a split operation, while in other examples, only the service computing device 202(1) on which the first partition leader resides may perform the split, and the new partitions may be subsequently replicated to other the service computing devices 202. In the illustrated example, suppose that the all three of the first partition the service computing device 202(1), 202(2) and 202(4) perform their own split operations. Nevertheless for clarity of illustration, only the details of the split operation on the service computing device 202(1) are shown in this example, with the split operations performed by the service computing devices 202(2) being essentially the same, with the exception that the first partition leader service computing device 202(1) forwards any new writes to the first partition follower service computing devices 202(2) and 202(4), but the follower devices do not have to perform this operation.

Just prior to initializing the split, the service computing device 202(1) may take an in-memory snapshot 142(1) of all the records that currently exist in the first partition 204. For example, the first partition 204(1) may be locked while the snapshot 142(1) is taken and then immediately unlocked so writes 206, e.g., from client computing devices, or the like, are able to continue. For instance, the snapshot 142(1) may be a read-only copy of the records or other data in the first partition 204, frozen at a point in time at which the snapshot 142(1) is taken. The service computing device 202(1) may use the snapshot 142(1) to perform the necessary calculations required for the split (e.g. determining information for a metrics schema of each new partition) while still allowing writes 206 to be performed against the first partition. The service computing device 202(1) may record the results of these calculations to the appropriate schemas in new partitions, e.g., a second partition 208(1) and a third partition 210(1) in this example. Any calculated metrics may be stored in the metrics schema in each of the new partitions 208(1), 210(1).

The service computing device 202(1) may perform the calculations for splitting the partition using the snapshot 142(1), which may include identifying to which new partition each record in the first partition belongs. To speed up this calculation some implementation may employ a FarmHash fingerprinting algorithm, such as the FarmHash Fingerprint64 open source algorithm discussed above that is optimized for low collisions and speed. The FarmHash algorithm allows quick comparison of multiple entries within a partition to determine whether they map to the new key space. Thus, during the processing using the FarmHash algorithm a second partition 208(1) and a third partition 210(1) may be created, and the data stored in the first partition 204(1) is divided between the second partition 208(1) and the third partition 210(1) based on the hashing algorithm. For example, the hashing algorithm may convert a path of each record stored in the first partition 204(1) into a string or the like, and the string may be assigned to one of the second partition 208(1) or the third partition 210(1) based on its value.

As mentioned above, during the processing performed using the snapshot 142(1) for splitting the first partition 204(1), writes 206 may continue to be applied to the first partition 204(1), and may be propagated from the first partition leader 204(1) to the first partition followers 204(2) and 204(3) according to the Raft algorithm. The results of the calculations are recorded to the appropriate schemas in the new partitions 208(1) or 210(1). For example, any calculated metrics are stored in the metrics schema in each of the new partitions 208(1) or 210(1). Some examples of metrics are object count and object size. To calculate these metrics, a processor may walk through each entry in the source partition 204(1), identify if a respective entry belongs to the first or second partitions, and calculate the values of these metrics based on the records that belong to each specific partition.

When writes 206 are received while the first partition 204 is being split by processing of the snapshot 142(1), in addition to performing a normal write operation to the primary schema of the first partition, the service computing device 202(1) may also record a split update command to a new schema or other data structure referred to herein as the split update DS 144. For instance, when a partition is not being split, and a new write 206 is received, split updates are not recorded to the split update DS 144. However, when a split is ongoing, and a new write is received, the split update DS 144 captures how the original calculations being performed in the background would be affected by this new write. For instance, if a new object is added to the first partition, this would increment the object count by 1. The fact that the object count is to be incremented by 1 may be stored as a record in the split update DS 144. Similarly, if an object is deleted, the service computing device 202(1) may store the fact that the object count is to be decrement by 1 as a record in the split update DS 144. The split update records stored in the split update DS may have an associated key corresponding to the new partition where the received update should be applied.

As one example, during splitting of the first partition 204(1) (source partition) whose keys are strings and whose key space is between null and null into two new target partitions, e.g., the second partition 208 and the third partition 210, whose key spaces are between null and max and max and null, respectively, suppose that a new record called "foo" is added to the first partition. In response, the service computing device 202(1) may store a split update record associated with foo with a key of 2. In some cases, because a record for is stored in the split update DS for each new write, the write response time that occurs when the partition is being split may be increased slightly. However, this may be considered to be a superior solution to blocking writes entirely as in the conventional alternative, i.e., the end-user experience may be much better if the end-user notices just a slightly additional latency for writes versus not being able to write at all.

In some examples, after the service computing device 202(1) finishes processing the snapshot 142(1), the service computing device 202(1) blocks writes and then updates the results just recorded using the split update commands accumulated from writes received while processing of the snapshot 142(1) was taking place. Typically, the number of split update commands in the split update DS 144 will be orders of magnitude smaller than the number of records processed from the snapshot 142(1). Since just a small subset of records in the split update DS 144 may typically be processed, the time window for the processing is substantially smaller than the conventional time window during which writes might be blocked.

In addition, to reduce the downtime even further, implementations herein have the capability to recursively process additional snapshots of any records that were written while processing a previous snapshot was being performed. The service computing device 202(1) might then only block writes when the number of records reaches a threshold count or after a set number of recursive calls to ensure that the partition split eventually completes. This technique makes the time window during which writes are blocked very small, thus making the system 200 much more responsive during splits. For example, a second snapshot 142(2) of the first partition 204(1) may be taken that includes the writes 206 received while the first snapshot 142(1) was being processed. Any writes received during processing of second snapshot 142(2) and the corresponding records in the split update DS 144 may continue to be stored in the first partition 204, but since only the delta over the previous snapshot is being processed, the processing time will typically be much shorter than for the first snapshot 142(1), so that substantially fewer writes 206 would likely be received during the processing of the snapshot 142(2). Thus, after several such iterations, there may actually be few or no additional writes to process, and the second partition 208 and the third partition 210 may be put into service.

Since the process discussed above may be executed concurrently on the service computing devices 202(1), 202(2) and 202(4), the process may result in three second partitions 208(1), 208(2) and 208(3), and three third partitions, 210(1), 210(2) and 210(3). Alternatively, in other examples, only the partition leader computing device might perform the processing, and the resulting second and third partitions 208(1) and 210(1), respectively may be replicated to the other service computing devices 202, such as based on the Raft algorithm, or according to instructions from the coordination service program 140.

Figure 3:
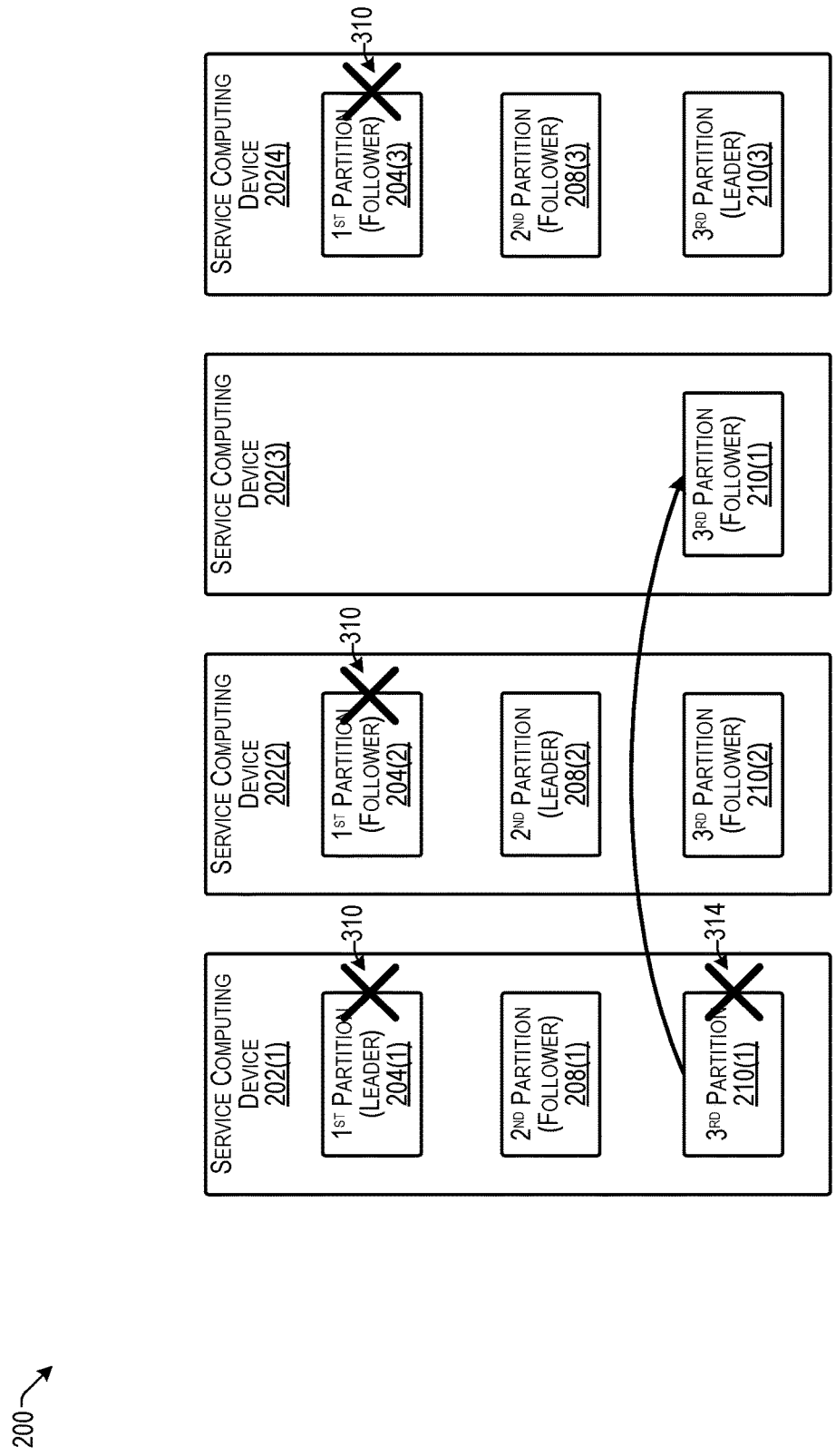
FIG. 3 illustrates the system following splitting of the first partition into the second and third partitions according to some implementations.

FIG. 3 illustrates the system 200 following splitting of the first partition into the second and third partitions according to some implementations. For example, following the split, the system may be rebalanced to distribute the processing and/or storage loads across the service computing devices in the system. As mentioned above, in some examples herein, each partition may be configured to operate according to the Raft consensus algorithm to provide redundant backups of the partitions. For example, the Raft algorithm ensures that each service computing device 202 agrees upon the same change to data in a respective partition. The Raft group achieves consensus via an elected leader, e.g., a particular service computing device 202 in a Raft group that includes a particular partition may be either the leader or a follower for the particular partition. The leader may be responsible for replication of changes to the partition to the follower computing nodes. The leader may regularly inform the followers of its existence by sending a heartbeat message. If the leader does not send the heartbeat message within a threshold period of time, the followers may elect a new leader from among the followers.

Accordingly, in some examples, based on the Raft consensus algorithm, each partition in the distributed database herein may include three partition members which replicate the data in the partition to achieve high availability and redundancy. Consensus among the partition members may be achieved using the Raft consensus algorithm. In the Raft consensus algorithm, a leader may be the partition member that services all client requests (e.g., reads, writes, and the like). The service computing device 202 that maintains the leader partition may replicate changes in the leader partition to the follower partitions on other ones of the service computing devices 202. Any service computing device 202 can become the leader for any of the partitions that it manages.

In this example, the service computing device 202(2) manages the second partition 208(2) as a leader and the third partition 210(2) as a follower. Further, such as for load balancing, the third partition 210(1) that was originally created on the service computing device 202(1) may be moved to the service computing device 202(3), which may manage the third partition 210(1) as a follower. Thus, each service computing device 202 may be part of multiple separate Raft groups, with each Raft group representing a different partition. In addition, after the second partition and the third partition are put into service, the first partition may be marked for deletion, as indicated at 310 for each of the members of the first partition 204. Further, after the third partition 210(3) is moved to the service computing device 202(3), the third partition 210(1) on the service computing device 202(1) may be deactivated and marked for deletion, as indicated at 314.

Each service computing device 202 may maintain a partition mapping between partition map entries and Raft groups. When a service computing device 202 receives a request from a client, the partition mapping may be consulted to determine to which Raft group the request belongs. If the service computing device 202 does not have a mapping for a particular request, an error may be returned to the requesting client. Otherwise, the request may be forwarded to the correct Raft group. If the service computing device 202 is the leader of that Raft group, the request is serviced by the service computing device. Otherwise, such as in the case that the service computing device is a follower of that Raft group, an error is returned to the requesting client containing the connection information of the leader of Raft group. Accordingly, the requesting client is provided information in the returned error message as to which service computing device to redirect the request.

Figure 4:
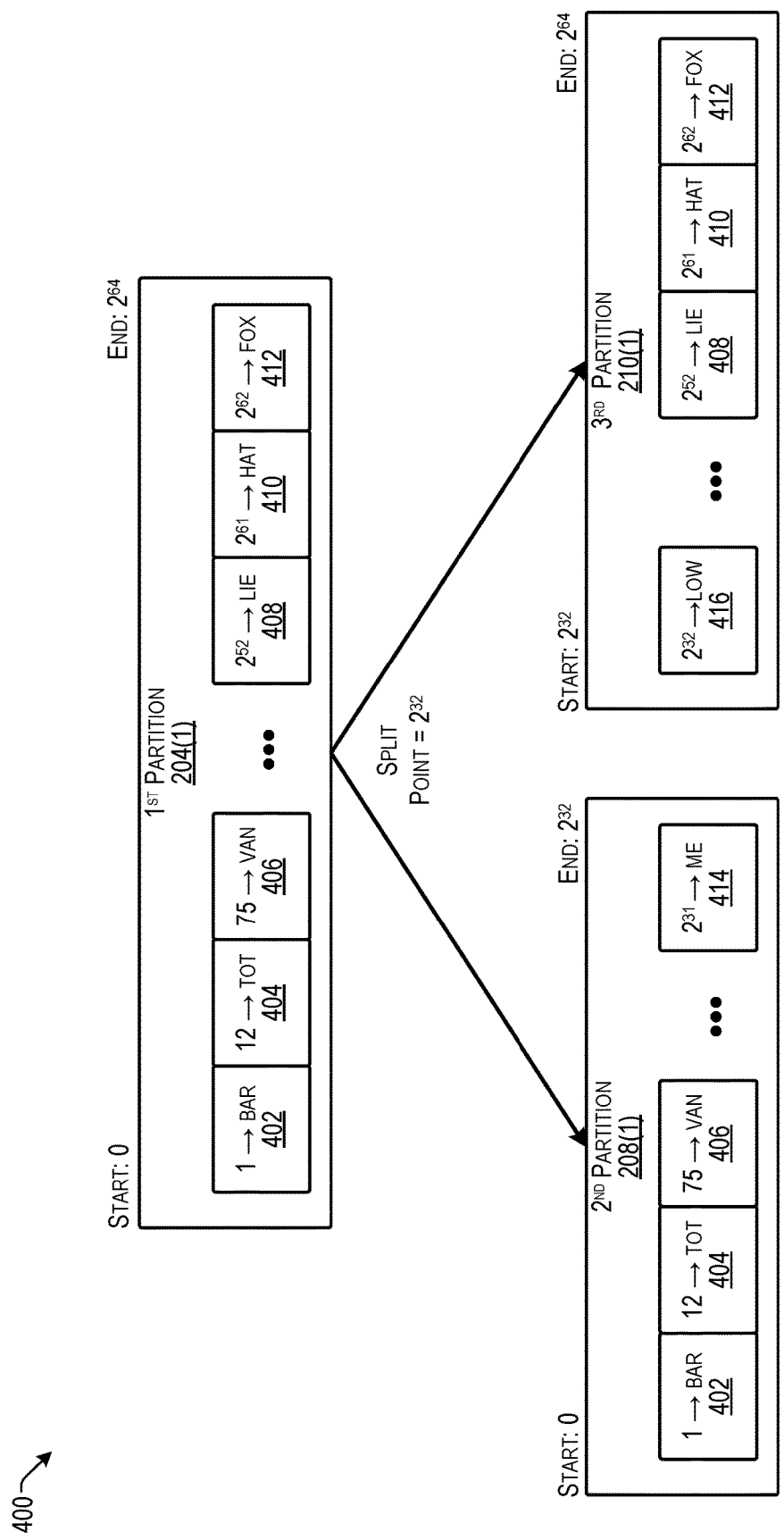
FIG. 4 is a block diagram illustrating a simplified example of the splitting the first partition 204(1) into two new partitions and according to some implementations.

FIG. 4 is a block diagram illustrating a simplified example 400 of the splitting the first partition 204(1) into two new partitions 208(1) and 210(1) according to some implementations. Partitioning of the data in the data herein allows scaling of the data by dividing the responsibility of regions of data across distinct service computing devices in the system. Splitting a partition may include dividing the key-space-ranges served by a single partition into two or more new partitions. Splitting a partition may occur when the amount of metadata included the partition has grown large and it is desirable to spread the metadata across a larger number of service computing devices. In this example, splitting of the first partition 204(1) is accomplished by dividing a key-space (i.e., the set of all possible keys) into key-space-ranges associated with the new partitions, i.e., the second partition 208(1) and the third partition 210(1). Each partition may be given a partition identifier and a set of key-space-ranges for which the service computing device managing the partition is responsible.

In the illustrated example, suppose that the first partition 204(1) includes a schema in which the key space starts with zero and ends with $2^{64}$, i.e., including key space ranges 402, 404, 406, . . . 408, 410, and 412. Further, suppose that the first partition 204(1) is split using a split point of $2^{32}$, and the second partition 208(1) and third partition 210(1) are created. The second partition 208(1) has a schema with key space ranges whose keys are less than $2^{32}$, i.e., including record ranges 402, 404, 406, . . . 414; while the third partition 210(1) has a schema of key space ranges whose keys are greater than $2^{32}$ and less than $2^{64}$, i.e., 416, . . . 408, 410, 412. As discussed above, the computing nodes may dynamically determine to split or otherwise divide a partition, such as for balancing the amount of data managed by each service computing device, managing an amount of traffic to particular computing nodes, or the like.

Further, in this example, the first partition may be split at a split point of the key space that may have been determined, e.g., by the coordination service program 140, or by any of various other techniques. For instance, in other examples, the split point may be determined to be at a different location depending on how the key space and the records included therein are generated. In some examples herein, in order to evenly distribute records within key spaces, the path of each record is hashed using a hashing function such as the FarmHash Fingerprint 64 function discussed above. The use of the hashing function helps prevent areas in the key space from becoming filled with records at a particular location within the key space, and instead serves to more randomly distribute the records throughout the key space. Furthermore, as mentioned above, because there may be a very large number of records in the key space and because performing a hash function on each of the records may consume a large amount of time, implementations herein may employ a fast, low-collision non-cryptographic hashing function for determining keys for the records stored in the partitioned database.

Figure 5:
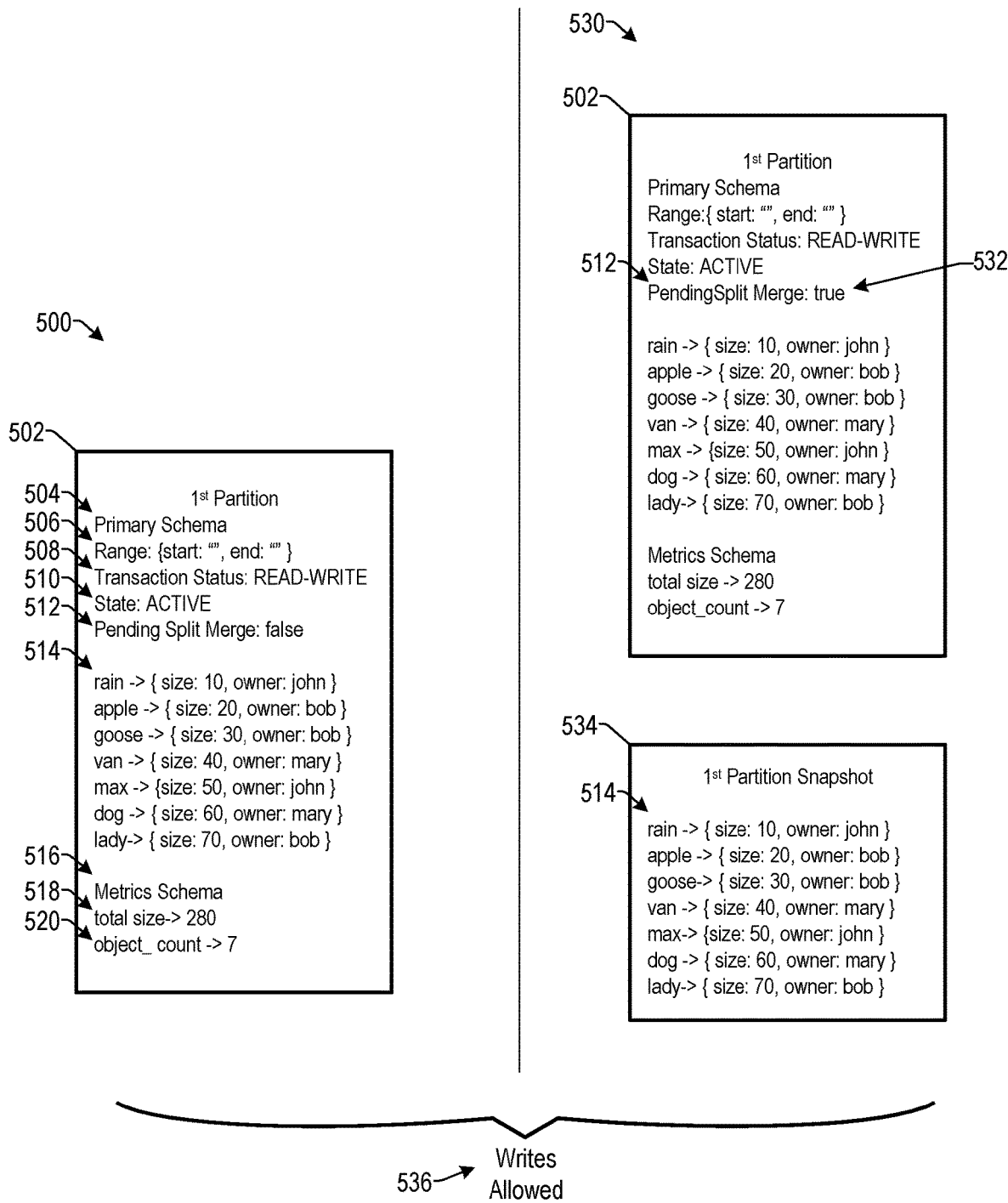
FIG. 5 illustrates a first partition before and after initiation of a partition split according to some implementations.

FIGS. 5-8 illustrate a more detailed example of splitting a first partition into two new partitions according to some implementations. FIG. 5 illustrates a first partition before and after initiation of a partition split according to some implementations. In this example, as indicated at 500, a first partition 502 includes a primary schema 504, a key-space range 506, a current transaction status 508, a current state 510, and an indicator 512 of whether a split or merge is pending for the partition. In this example, there is no pending partition merge or split indicated for the first partition and therefore this value is indicated to be false. In addition, the first partition 502 includes a plurality of objects as indicated at 514 that are maintained in the partition, and further includes a metrics schema 516 that includes a total size 518 of the first partition and an object count 520 of the objects stored in the first partition.

At 530, suppose that the service computing device that maintains the first partition 502 has received an instruction to split the first partition 502. In response, the service computing device may update the first partition including changing the indicator 512 for pending split merge from false to true, as indicated at 532. In addition, the service computing device may generate a snapshot 534 of a current state of the objects in the first partition 514.

As indicated at 536, both before and after generation of the snapshot, writes to the first partition 502 are allowed. However, in some cases, writes may be temporarily suspended while the snapshot 534 is generated for the first partition. Furthermore, for ease of illustration, only seven existing objects 514 in the first partition are illustrated in this example. However in practice, when a split is to be performed there may be hundreds of thousands of records in a partition to be split.

Figure 6:
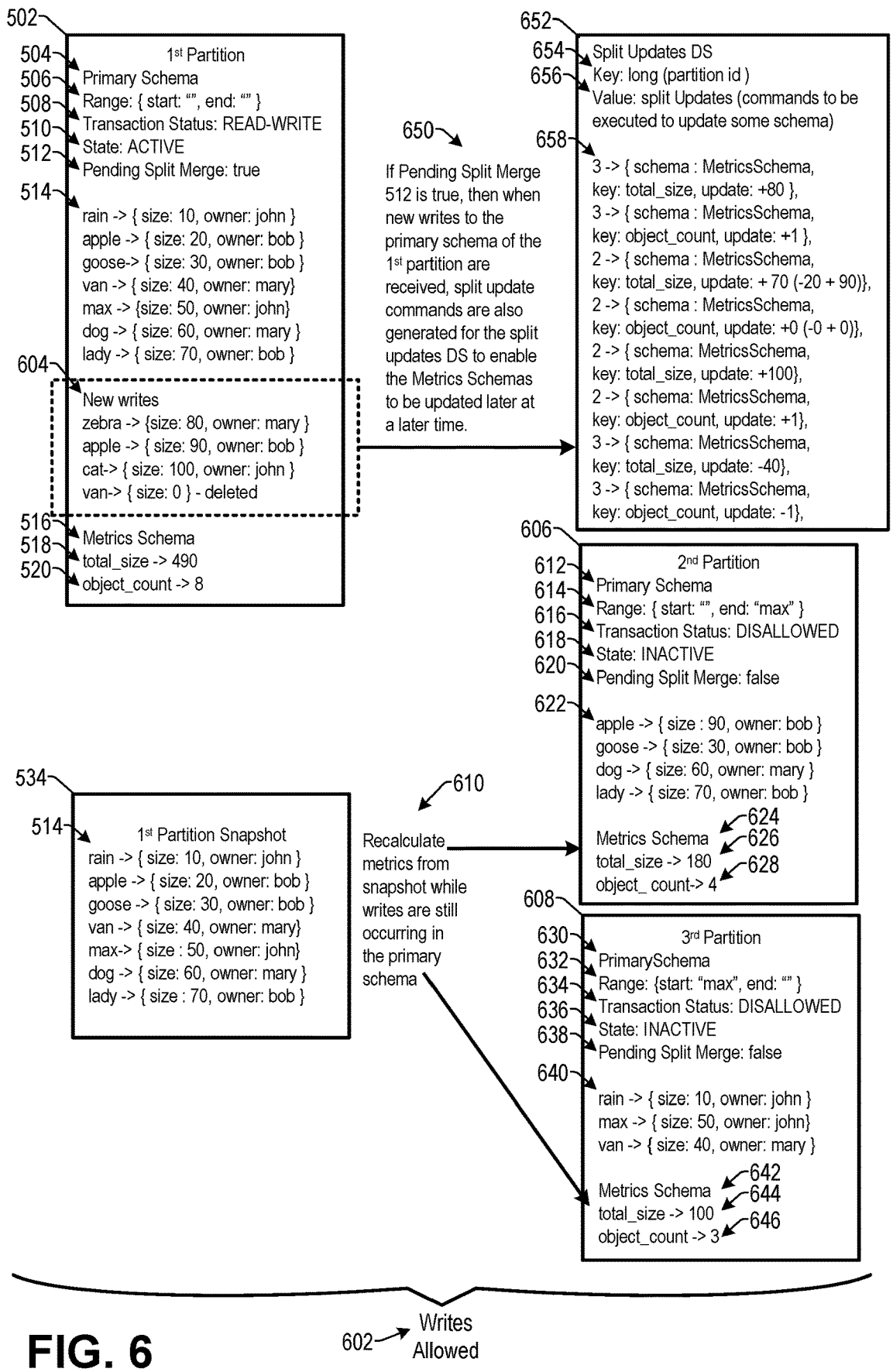
FIG. 6 illustrates an example of processing the first partition snapshot while allowing new writes to be received at the first partition according to some implementations.

FIG. 6 illustrates an example of processing the first partition snapshot while allowing new writes to be received at the first partition according to some implementations. In the example of FIG. 6, as indicated at 602 writes to the first partition 502 are allowed while processing of the first partition snapshot 534 is performed. For instance, new writes 604 to the first partition 502, including addition of four new objects and deletion of another object, are shown in this example. The new writes 604 may be added to the first partition 502 as they are received while the processing of the first partition snapshot 534 is being performed for splitting the first partition 502 into a second partition 606 and a third partition 608. For instance, as indicated at 610, processing of the first partition snapshot may include recalculating metrics from the snapshot 534 while rights is still occurring in the primary schema of the first partition 502. The recalculation the metrics from the snapshot 534 may determine the new metrics schemas for the second partition 606 and the third partition 608.

For example, the second partition 606 includes a primary schema 612, a range 614, a transaction status 616, a state 618, and a pending split merge indicator 620. In this example, because the second partition 606 is not yet active, the transaction status 616 is disallowed, the state 618 is inactive, and the pending split merge indicator 620 is false. Furthermore, the second partition 606 includes a plurality of objects 622 from the first partition, and a metrics schema 624 including a total size 626 and object count 628 of the objects 622.

Similarly, the third partition 608 includes a primary schema 630, a range 632, a transaction status 634, a state 636, and a pending split merge indicator 638. In this example, because the third partition 608 is not yet active, the transaction status 634 is disallowed, the state 636 is inactive, and the pending split merge indicator 638 is false. Furthermore, the third partition 608 includes a plurality of objects 640 from the first partition, and a metrics schema 642 including a total size 644 and object count 646 of the objects 640.

Furthermore, in this example, suppose the split point of the primary schema 504 of the first partition 502 is at key space range "max" Accordingly, the range 614 of the second partition 606 ends at max and the key space range of the third partition 608 begins at max. Accordingly, the objects 622 included in the second partition 606 correspond to the range 614, while the objects 640 included in the third partition correspond to the range 632.

When the new writes 604 are received to the first partition 502, the service computing device perform the processing for the partition split, may check to see if the pending split and merge indicator 512 is set to true for the first partition. If so, as indicated at 650, when new writes 604 to the primary schema 504 of the first partition 502 are received, split update commands are also generated for a split updates data structure (DS) 652 to enable the metrics schemas 624, 642 in the second partition 606 and the third partition 608, respectively, to be updated at a later time.

The split updates DS 652 includes a key 654 that indicates a partition ID and a value 656 that indicates that the commands are to be executed to update a specified schema. In addition, the split updates DS 652 includes a plurality of split updates commands 658 including a key indicator two or three to indicate whether the command is to be applied to the metrics schema of the second partition 606 or the third partition 608. Accordingly, as each new write 604 is received by the first partition, the service computing device performing the split may update the split updates DS 652 with a corresponding split updates command 658 that indicates changes to the corresponding metrics schema 624 or 642 of the partition to which that new write will eventually be added.

Figure 7:
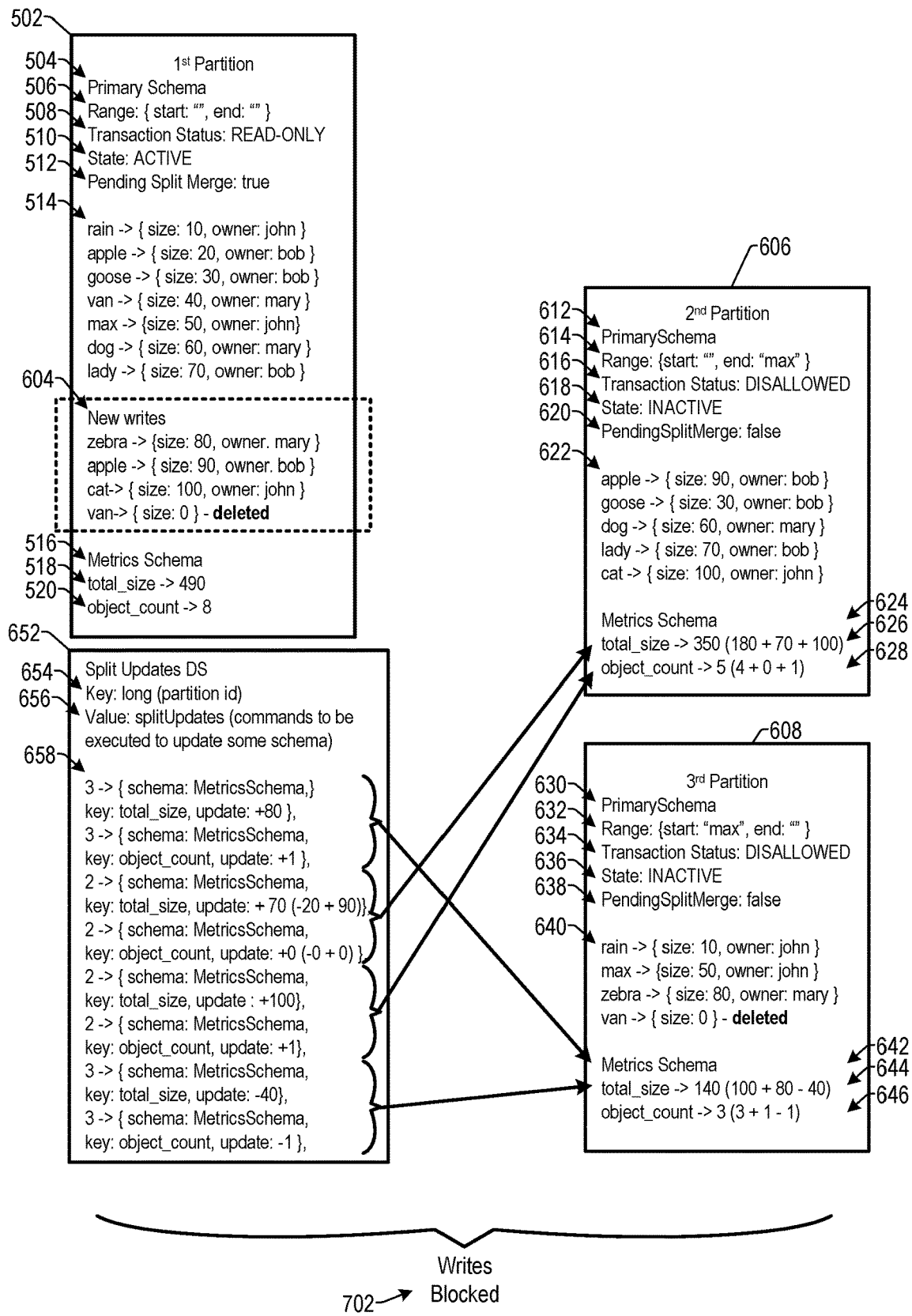
FIG. 7 illustrates an example of applying the new writes to the second and third partitions according to some implementations.

FIG. 7 illustrates an example of applying the new writes to the second and third partitions according to some implementations. For example, as indicated at 702, during the process of FIG. 7, writes to the first partition may be blocked while the second partition 606 and the third partition 608 are updated for the new writes 604 received at the first partition 602 while the snapshot was being used to calculate the metrics schemas for the second partition and the third partition. For example, the transaction status of the first partition 502 may be changed from read and write to read-only.

In this example, the objects in the second partition 606 and the third partition 608 are updated based on the new writes 604 received at the first partition 502. For example, the "cat" object and the "apple" object added to the first partition 502 are added to the objects 622 in the second partition 606. Similarly, the "zebra" object added to the first partition 502 is added to the objects 640 in the third partition 608, and the "van" object deleted from the first partition 502 is deleted from the objects 640 in the third partition 608.

In addition, the split update commands 658 from the split updates data structures 652 are used to update the metrics schemas 624 and 642 of the second partition 606 and the third partition 608 respectively. For example, the split update commands having a key of "2" are applied to the metrics schema 624 of the second partition 606. Similarly the split update commands having a key of "3" are applied to the metrics schema 642 of the third partition 608. Accordingly, based on the application of the split update commands the total size 626 of the metrics schema 624 of the second partition is increased from 182 350 while the object count 628 is increased from 4 to 5. Similarly the total size 644 of the metrics schema 642 of the third partition 608 is increased from 100 to 140 while the object count 646 remains the same because one object was added while another object was deleted. Thus application of the split updates to the metrics schemas of the second partition 606 and the third partition 608 serves to update the existing metrics when the snapshot was processed to reflect any new writes received. Accordingly, the amount of time that writes are blocked may be substantially shorter than would be the case if writes were blocked during the entire calculation of the metrics schemas for the second partition 606 and the third partition 608.

Furthermore, as discussed they above, in an alternative implementation, a second snapshot of the first partition 502 may be taken (not shown in FIG. 7). The second snapshot and the split updates data structures 652 may be used to update the second partition 606 and the third partition 608 without blocking rights while the update is performed, and instead new writes may continue to be received by the first partition 502. This process may be performed recursively for a fixed number of times, thereby continually reducing the amount of time during which writes may be blocked.

Figure 8:
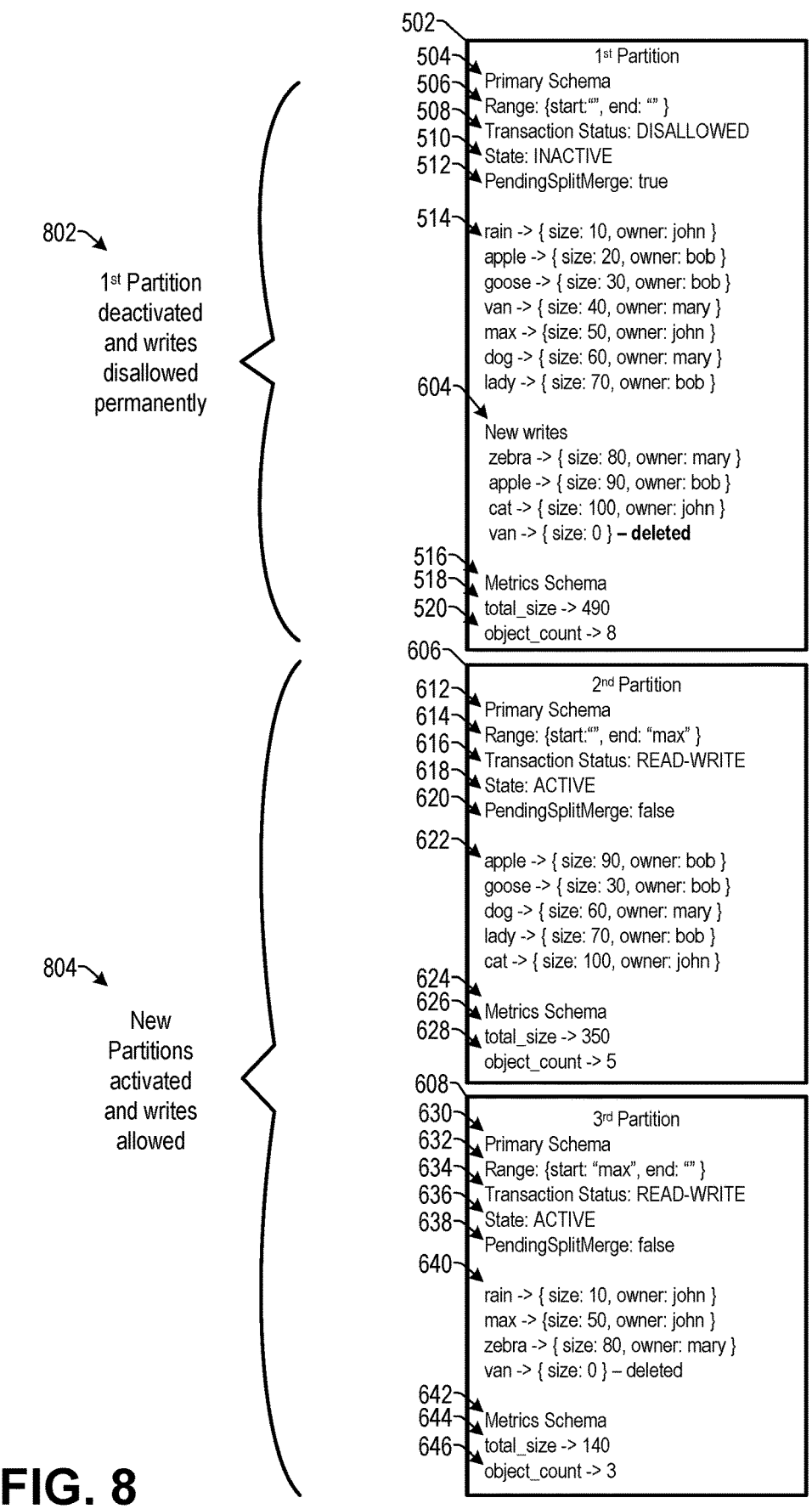
FIG. 8 is a block diagram illustrating an example configuration of the first partition, the second partition, and the third partition following the split of the first partition according to some implementations.

FIG. 8 is a block diagram illustrating an example configuration of the first partition 502, the second partition 606, and the third partition 608 following the split of the first partition according to some implementations. Following completion of the split, as indicated at 802, the first partition 502 may be deactivated any future rights may be disallowed permanently. For example, the transaction status 508 of the first partition may be changed to "disallowed" and the state 510 of the first partition may be changed to "inactive". Furthermore, the first partition 502 may be deleted and/or marked for deletion to result in eventual deletion of the first partition from the system, such as through a garbage collection feature or the like.

Furthermore, as indicated at 804, the new second partition 606 and third partition 608 are activated and writes to the new partitions are allowed. For example, the transaction statuses 616 and 634 of the second partition 606 and the third partition 608, respectively, are switched to "read-write" and the states 618 and 636, respectively, are set to active. Furthermore, following the split, the second partition and the third partition may be replicated to other service computing devices in the system according to the raft algorithm as discussed above.

Figure 9:
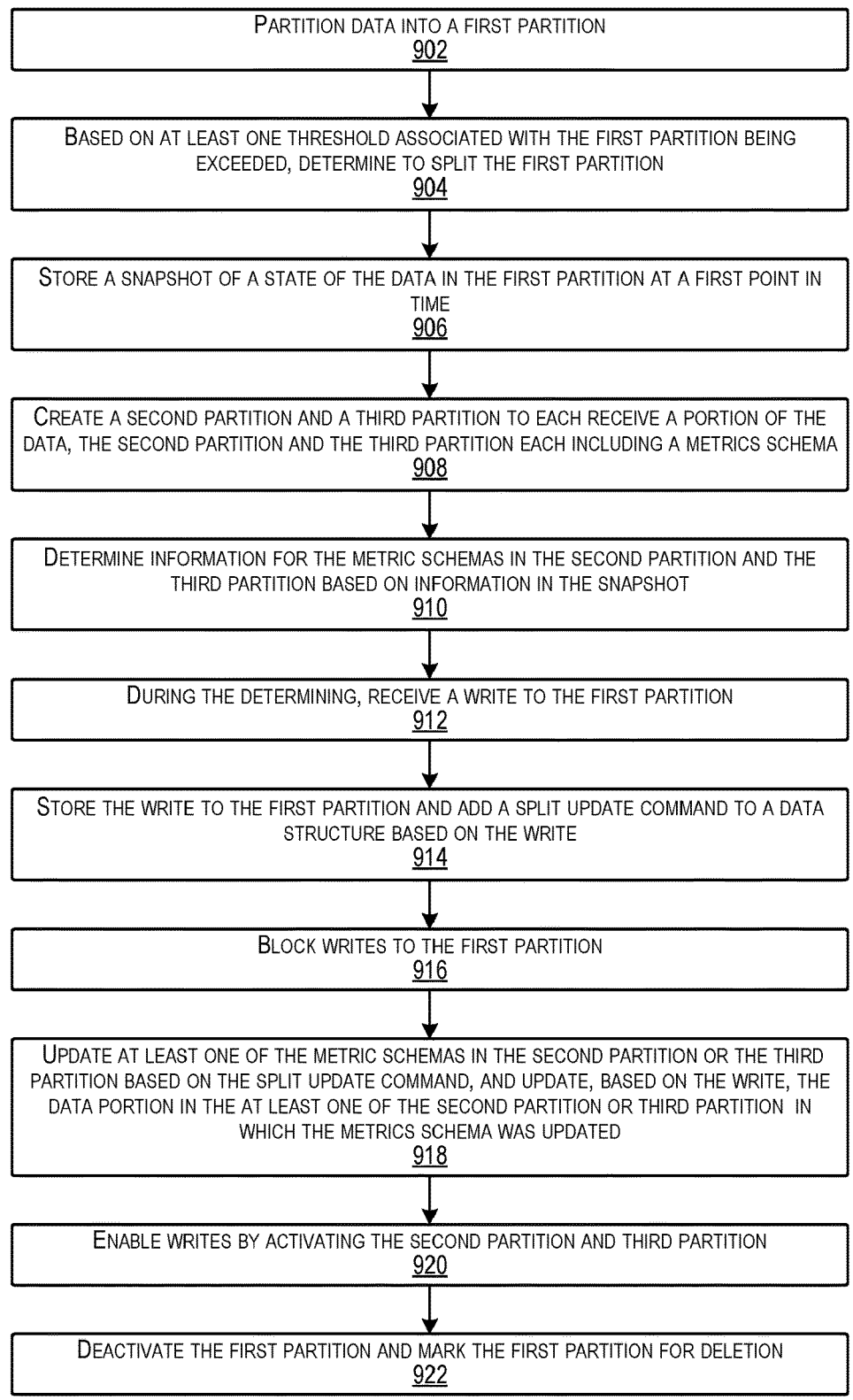
FIG. 9 is a flow diagram illustrating an example process for dynamic adaptive partition splitting according to some implementations.

FIG. 9 is a flow diagram illustrating an example process for dynamic adaptive partition splitting according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems. In FIG. 9, the process 900 may be executed at least in part by the one or more service computing devices 92, 202 executing the node management program 146.

At 902, the computing device may partition data into a first partition. In some examples, the computing device may use a non-cryptographic hashing algorithm to assign individual data objects to respective key ranges in the first partition.

At 904, based on at least one threshold associated with the first partition being exceeded, the computing device may determine to split the first partition. For example, an he instruction to split may be received based at least in part on the first partition meeting at least one threshold associated with the first partition, the at least one threshold specifying at least one of a threshold partition size, a traffic volume threshold, a response latency threshold, a disk or memory utilization threshold, or a network latency threshold.

At 906, the computing device may store a snapshot of a state of the data in the first partition at a first point in time.

At 908, the computing device may create a second partition and a third partition to each receive a portion of the data, the second partition and the third partition each including a metrics schema.

At 910, the computing device may determine information for the metric schemas in the second partition and the third partition based on information in the snapshot.

At 912, during the determining, the computing device may receive a write to the first partition. For example, the write may include at least one of a write command, a delete command, a create command, or an update command.

At 914, the computing device may store the write to the first partition and add a split update command to a data structure based on the write.

At 916, the computing device blocks writes to the first partition. For example, the computing device blocks writes to the first partition while updating at least one of the metrics schemas with the update split command.

At 918, the computing device may update at least one of the metric schemas in the second partition or the third partition based on the split update command, and update, based on the write, the data portion in the at least one of the second partition or third partition in which the metrics schema was updated. For example, the split update command may include information for changing the at least one metric schema to a condition that corresponds to inclusion of the write in a respective one of the second partition or the third partition. Additionally, in some examples, the computing device may take a second snapshot of the first partition following the determining the information for the metrics schemas in the second partition and the third partition based on the information in the first snapshot. The computing device may determine additional information for the metrics schemas in the second partition and the third partition based on the information in the second snapshot and the data structure. Furthermore, during the determining the additional information for the metrics schemas in the second partition and the third partition based on the information in the second snapshot and the data structure, the computing device may receive an additional write to the first partition, and may update the first partition based on the additional write and may add an additional split update command to the data structure based on the additional write. In addition, the computing device may update at least one of the metrics schemas in the second partition or the third partition based on the additional split update command.

At 920, the computing device may enable writes by activating the second partition and third partition.

At 922, the computing device may deactivate the first partition and mark the first partition for deletion.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 10:
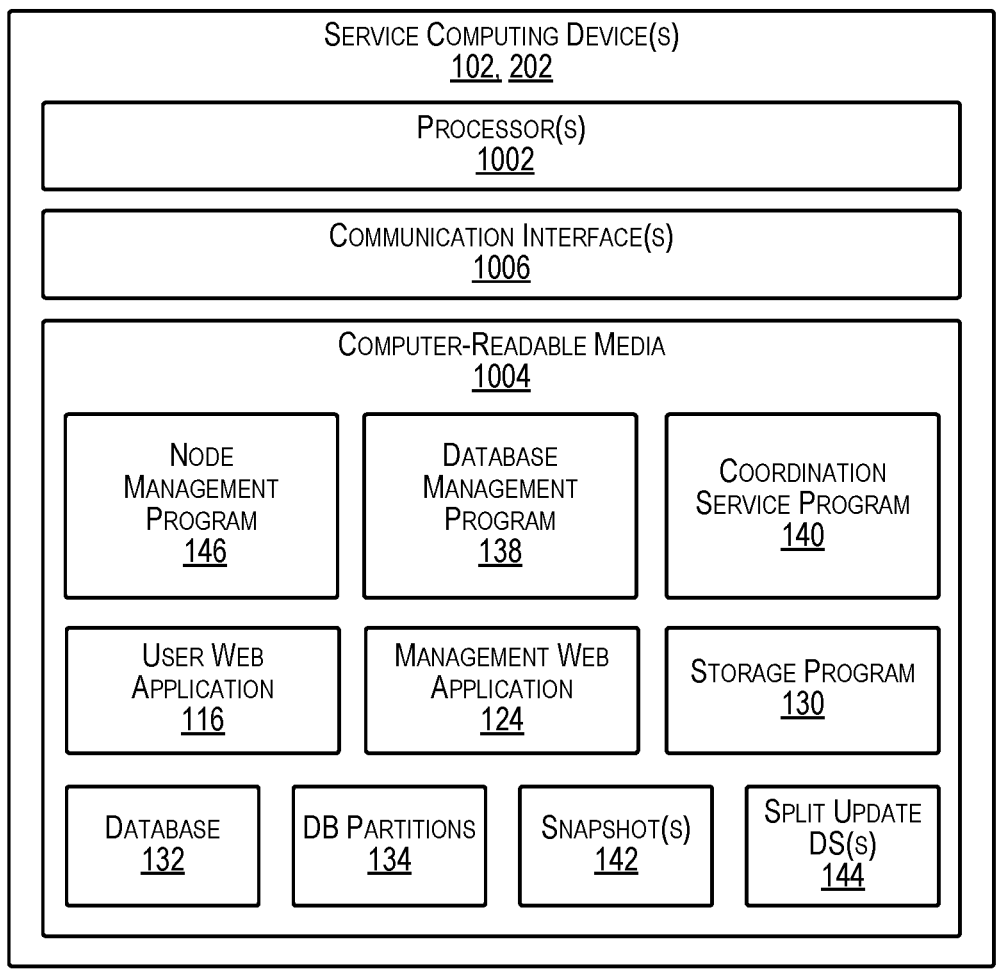
FIG. 10 illustrates select example components of the service computing devices that may be used to implement at least some of the functionality of the systems described herein.

FIG. 10 illustrates select example components of the service computing devices 102, 202 that may be used to implement at least some of the functionality of the systems described herein. The service computing devices 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing devices 102, 202 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 102, 202 includes, or may have associated therewith, one or more processors 1002, one or more computer-readable media 1004, and one or more communication interfaces 1006. Each processor 1002 may be a single processing unit or a number of processing units, and may include single or multiple computing units, or multiple processing cores. The processor(s) 1002 can be implemented as one or more central processing units, microprocessors, microcomputers, microcontrollers, digital signal processors, state machines, logic circuitries, and/or any devices that manipulate signals based on operational instructions. As one example, the processor(s) 1002 may include one or more hardware processors and/or logic circuits of any suitable type specifically programmed or configured to execute the algorithms and processes described herein. The processor(s) 1002 may be configured to fetch and execute computer-readable instructions stored in the computer-readable media 1004, which may program the processor(s) 1002 to perform the functions described herein.

The computer-readable media 1004 may include volatile and nonvolatile memory and/or removable and non-removable media implemented in any type of technology for storage of information, such as computer-readable instructions, data structures, program modules, or other data. For example, the computer-readable media 1004 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 102, 202, the computer-readable media 1004 may be a tangible non-transitory medium to the extent that, when mentioned, non-transitory computer-readable media exclude media such as energy, carrier signals, electromagnetic waves, and/or signals per se. In some cases, the computer-readable media 1004 may be at the same location as the service computing device 102, 202, while in other examples, the computer-readable media 1004 may be partially remote from the service computing device 102, 202. For instance, in some cases, the computer-readable media 1004 may include a portion of storage in the network storage 104 discussed above with respect to FIG. 1.

The computer-readable media 1004 may be used to store any number of functional components that are executable by the processor(s) 1002. In many implementations, these functional components comprise instructions or programs that are executable by the processor(s) 1002 and that, when executed, specifically program the processor(s) 1002 to perform the actions attributed herein to the service computing device 102, 202. Functional components stored in the computer-readable media 1004 may include the node management program 146 that may be executed by a respective service computing device 102, 202 for managing partitions on the service computing device 102, 202, such as by performing partition splits and merges, receiving and responding to communications from other service computing devices 102, 202 and client devices, executing operations according to the Raft algorithm, and so forth. Additional functional components stored in one or more of the service computing devices 102, 202 may include the user web application 106, the management web application 124, the storage program 130, the database management program 138, and the coordination service program 140, each of which may include one or more computer programs, applications, executable code, or portions thereof. Further, while these programs are illustrated together in this example, during use, some or all of these programs may be executed on separate service computing devices 102, 202.

In addition, the computer-readable media 1004 may store data, data structures, and other information used for performing the functions and services described herein. For example, the computer-readable media 1004 may store the metadata database 132 including the DB partitions 134, and may store at least temporarily, the snapshot(s) 142 and the split update data structures(s) 144. Further, while these data structures are illustrated together in this example, during use, some or all of these data structures may be stored on separate service computing devices 102, 202. The service computing device 102, 202 may also include or maintain other functional components and data, which may include programs, drivers, etc., and the data used or generated by the functional components. Further, the service computing device 102, 202 may include many other logical, programmatic, and physical components, of which those described above are merely examples that are related to the discussion herein.

The one or more communication interfaces 1006 may include one or more software and hardware components for enabling communication with various other devices, such as over the one or more network(s) 106, 107. For example, the communication interface(s) 1006 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors configured by executable instructions to perform operations comprising:
receiving, by the one or more processors, an instruction to split a first partition including a plurality of metadata objects;
storing, by the one or more processors, a first snapshot of a state of the plurality of metadata objects at a first point in time;
creating, by the one or more processors, a second partition and a third partition to each receive a portion of the metadata objects, the second partition and the third partition each including a metrics schema including an object count and an object size;
determining, by the one or more processors, information for the metrics schemas in the second partition and the third partition based on information in the first snapshot;
during the determining, receiving, by the one or more processors, a write to the first partition;
updating, by the one or more processors, the first partition based on the write and adding a split update command to a data structure based on the write, the split update command including information for changing at least one metrics schema to a condition that corresponds to inclusion of the write in a respective one of the second partition or the third partition;
updating, by the one or more processors, the at least one of the metrics schemas in at least one of the second partition and the third partition based on the split update command; and
updating, based on the write, the portion of the metadata objects in the at least one of the second partition or third partition in which the metrics schema was updated based on the split update command.

2. The system as recited in claim 1, the operations further comprising blocking writes to the first partition while updating the at least one of the metrics schemas with the update split command.

3. The system as recited in claim 1, the operations further comprising:
taking a second snapshot of the first partition following the determining the information for the metrics schemas in the second partition and the third partition based on the information in the first snapshot; and
determining additional information for the metrics schemas in the second partition and the third partition based on the information in the second snapshot and the data structure.

4. The system as recited in claim 3, the operations further comprising:
during the determining the additional information for the metrics schemas in the second partition and the third partition based on the information in the second snapshot and the data structure, receiving an additional write to the first partition;
updating the first partition based on the additional write and adding an additional split update command to the data structure based on the additional write; and
updating at least one of the metrics schemas in the second partition or the third partition based on the additional split update command.

5. The system as recited in claim 1, the operations further comprising activating the second partition and the third partition for receiving writes and marking the first partition for deletion.

6. The system as recited in claim 1, the operations further comprising using a non-cryptographic hashing algorithm to assign the metadata objects to respective key ranges in the first partition.

7. The system as recited in claim 1, wherein the instruction to split is received based at least in part on the first partition meeting at least one threshold associated with the first partition, the at least one threshold specifying at least one of a threshold partition size, a traffic volume threshold, a response latency threshold, a disk or memory utilization threshold, or a network latency threshold.

8. The system as recited in claim 1, wherein the write comprises at least one of a write command, a delete command, a create command or an update command.

9. The system as recited in claim 1, wherein the system is in communication with a network storage, and the metadata objects include information about objects stored by the network storage.

10. A method comprising:
storing, by a computing device, a first snapshot of a state of a plurality of data objects in a first partition at a first point in time;
creating, by the computing device, a second partition and a third partition to each receive a portion of the data objects, the second partition and the third partition each including a metrics schema including an object count and an object size;
determining, by the computing device, information for the metrics schemas in the second partition and the third partition based on information in the first snapshot;
during the determining, receiving, by the computing device, a write to the first partition;
updating, by the computing device, the first partition based on the write and adding a split update command to a data structure based on the write, the split update command including information for changing at least one metrics schema to a condition that corresponds to inclusion of the write in a respective one of the second partition or the third partition;

updating, by the computing device, the at least one of the metrics schemas in at least one of the second partition and the third partition based on the split update command; and updating, based on the write, the portion of the metadata objects in the at least one of the second partition or third partition in which the metrics schema was updated based on the split update command.

11. One or more non-transitory computer-readable media storing instructions that, when executed by one or more processors, configure the one or more processors to perform operations comprising:

storing, by a computing device, a first snapshot of a state of data in a first partition at a first point in time;

creating, by the computing device, a second partition and a third partition to each receive a portion of the data, the second partition and the third partition each including a metrics schema;

determining, by the computing device, information for the metrics schemas in the second partition and the third partition based on information in the first snapshot;

during the determining, receiving, by the computing device, a write to the first partition;

updating, by the computing device, the first partition based on the write and adding a split update command to a data structure based on the write, the split update command including information for changing at least one metrics schema to a condition that corresponds to inclusion of the write in a respective one of the second partition or the third partition;

updating, by the computing device, the at least one of the metrics schemas in at least one of the second partition and the third partition based on the split update command; and updating, based on the write, the portion of the metadata objects in the at least one of the second partition or third partition in which the metrics schema was updated based on the split update command.

* * * * *